May 14, 1957

J. STEWART 2,792,570

RADIO NAVIGATION SYSTEMS

Filed April 13, 1953

INVENTOR:
JOHN STEWART
By: Young, Emery & Thompson
Attys.

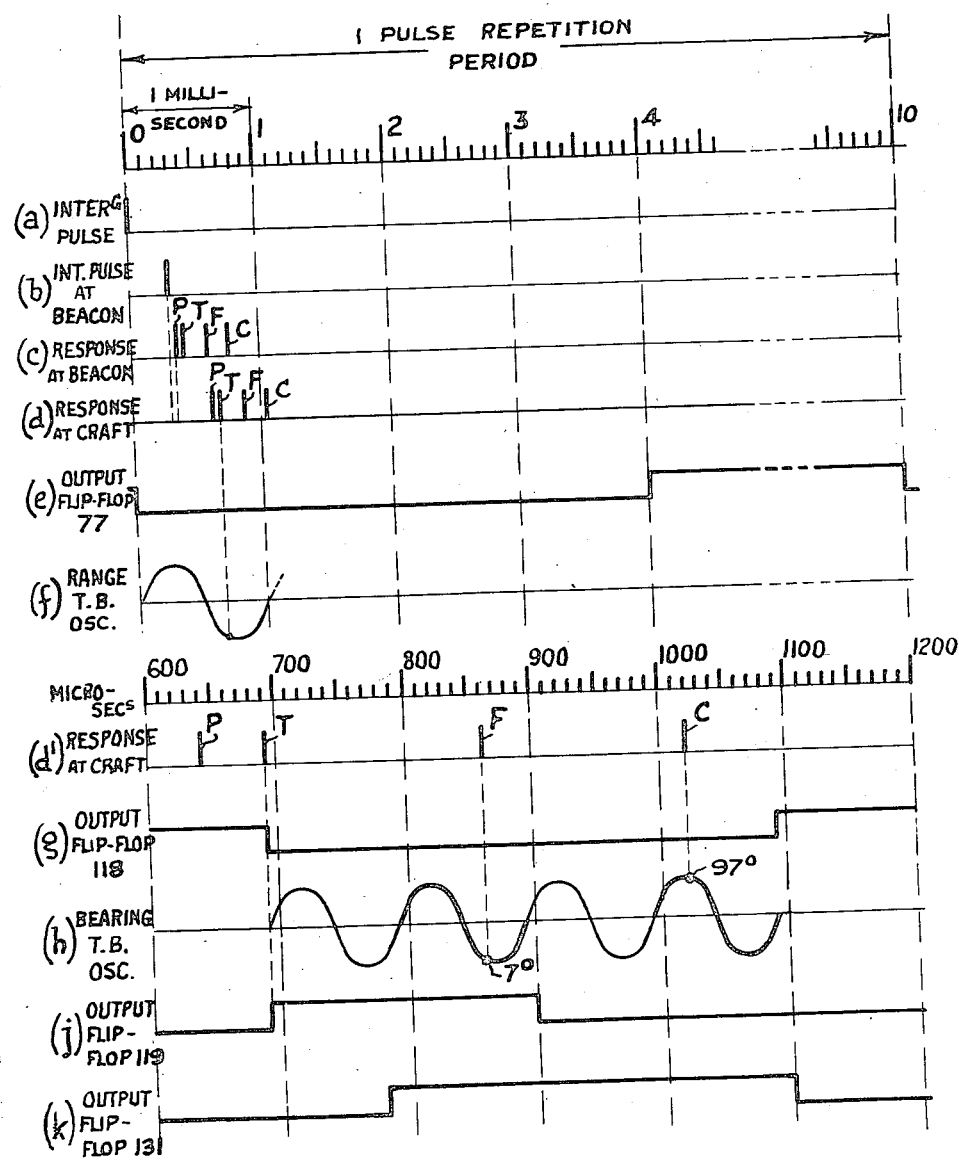

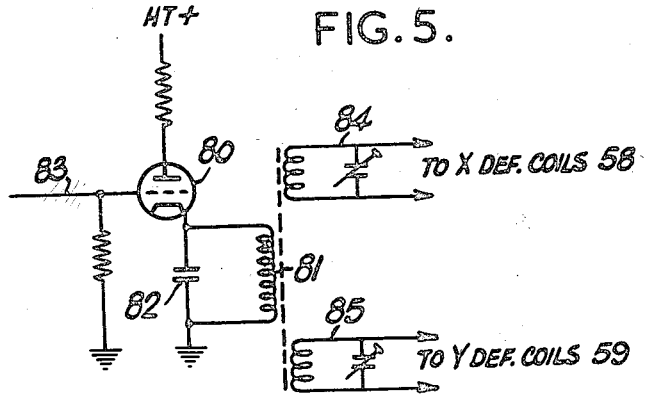
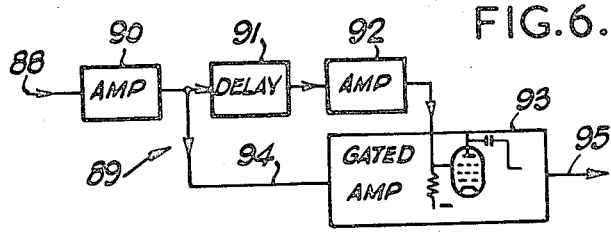
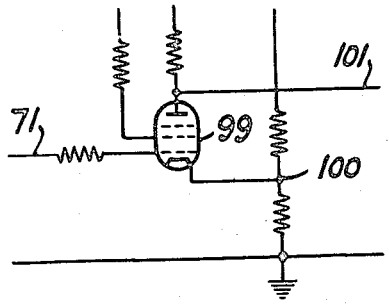

United States Patent Office 2,792,570
Patented May 14, 1957

2,792,570

RADIO NAVIGATION SYSTEMS

John Stewart, Edinburgh, Scotland, assignor to Ferranti Limited, Hollinwood, England, a British company Application April 13, 1953, Serial No. 348,261

Claims priority, application Great Britain April 15, 1952

16 Claims. (Cl. 343—106)

This invention relates to radio navigation systems of the kind which includes a beacon station arranged to respond to an interrogating signal radiated by a transmitter in an aircraft or other vehicle (hereinafter called a craft), the response from the beacon being received by a co-operating receiver carried by such craft and subsequently interpreted to provide the required navigational aiding information.

When it is desired that such a system should supply distance or range information it has hitherto been usual to employ a beacon station having an omni-directional transmission/reception characteristic rather than a so-called "rotating-beam" beacon. By the term "rotating beam" beacon is meant a beacon station having a common receive/transmit aerial array of highly directional characteristic arranged to rotate in azimuth. The main advantage of the omni-directional system is that, as there is no time limit to the periods during which interrogation and response may be carried out, the wanted response signal at the craft may be selected by a searching strobe which ensures the elimination from the associated receiver display of most of the random noise and almost all of the unwanted signals which may be present in the vicinity including responses by the same beacon to the interrogations thereof by other craft. The use and design of such a strobe system are well-known and need not be described here.

A rotating-beam beacon system has, however, certain important advantages. One of these is the fact that the transmitter power and the receiver sensitivity can be considerably reduced. Another is that the system allows directional information to be given; for example, the beacon response to any interrogation signal may be modulated in some convenient manner in dependence at any moment on the bearing of the beam with respect to some datum direction at that particular moment. A difficulty hitherto experienced with such an arrangement, however, is that as each craft is in the rotating and highly directional beam for only a short time during each complete scan or revolution of the beam in azimuth, the searching-strobe method of eliminating unwanted signals at the aircraft receiver is not practicable. A further difficulty arises from the fact that any distance or range measurement that may be effected during the short period while the craft is in the beam of the beacon, has to be "remembered" during the much longer period that elapses before the craft is in the beam once again.

The object of the present invention is to provide a radio navigation system of the kind set forth above having a rotating directional beam and in which the difficulties referred to are either greatly reduced or eliminated. A further object of the invention is to provide a radio navigation system having improved means of giving directional information.

In accordance with the present invention there is provided in a radio navigation system of the kind set forth and in which said beacon is of the rotating beam type, means for causing the co-operating transmitter of a craft to interrogate said beacon when in the beam thereof, a timing device associated with the co-operating receiver of said craft for directing the signals received from the beacon in response to such interrogation into sequential channels in dependence upon the time of arrival of those signals and display means for indicating the channel containing the strongest integrated signal, that is to say, the strongest signal as integrated over each period in which the craft is in said beam.

In a preferred form of the invention the beacon is arranged to transmit, in response to each interrogation signal, a pulsed range indicating signal occurring at a fixed time interval after the arrival of the interrogating signal and also a pulsed bearing signal occurring at a time interval relative to said range signal which is dependent upon the bearing of the beam at that instant with respect to a datum direction, such as true North. In such a preferred arrangement the timing device may be duplicated, a first device being responsive to said range signals and a second device being responsive to said bearing signals. Gating means or the like may be provided to prevent said first device from responding to said range signals. Each bearing signal may consist of two separate pulses arranged to afford respectively a coarse and a fine indication of the bearing value. In such case said other device may be duplicated or modified so as to respond independently to said two pulses.

In order that the nature of the invention may be more readily understood embodiments thereof will now be described by way of illustrative example with reference to the accompanying drawings in which Figure 1 is a block schematic diagram of the arrangements provided at the beacon station;

Figure 3 is a series of diagrams to a common time scale showing the various pulse timing ranges and a number of related electric waveforms;

Figures 5 and 6 illustrate certain elements of the mobile craft apparatus in greater detail;

Figure 7 illustrates a further element of the mobile craft apparatus.

Figure 1:
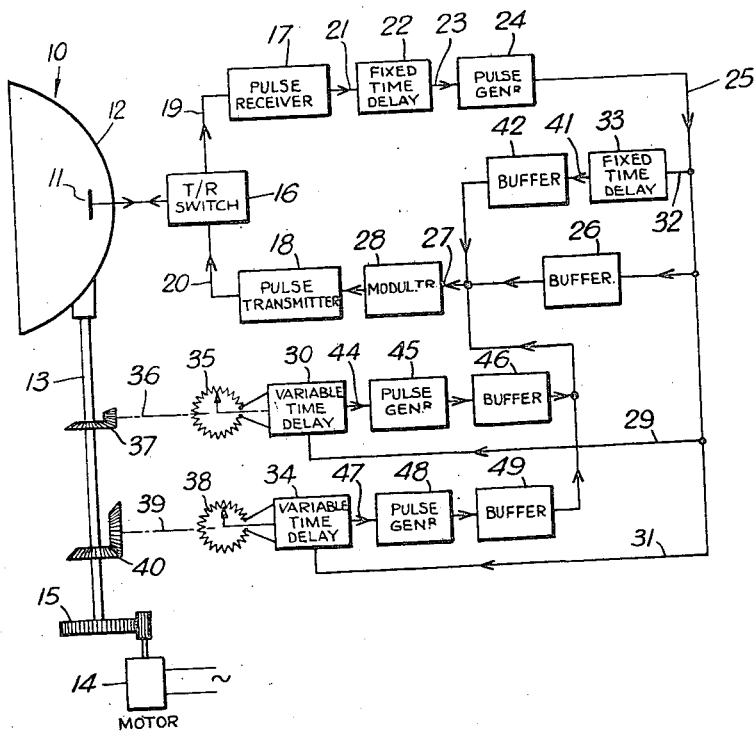

Figure 1 illustrates one arrangement for the rotating beam type of radio beacon which is normally stationary and located at a known geographical position. This beacon comprises a highly directional aerial structure 10 including an aerial array 11 within a reflector 12 arranged for continuous rotation in azimuth by mounting upon a vertical shaft 13 which is driven by a suitable electric motor 14 through gearing 15. The aerial structure 10 is conveniently rotated at a speed of approximately 20 revolutions per minute while the aerial design is such that it has a width of beam in azimuth of the order of 5°. The aerial array 11 is a common one used for both reception and transmission and may comprise any convenient known arrangement for such pulse beacon devices including, as illustrated, T/R switch means 16 by which the aerial is normally connected by way of lead 19 to a pulse signal receiver 17 but is momentarily switched to co-operate with an associated pulse signal transmitter 18 by way of lead 20 at the required instants of outgoing transmitted pulses. The T/R switch means 16, the receiver 17 and the transmitter 18 can be of any suitable known form, e. g. as commonly used for responder beacons in radar systems.

The demodulated pulse signal output from the receiver 17 is applied over lead 21 to a delay circuit 22 which serves to impose a time delay of predetermined fixed value upon signals passing therethrough. Such delay circuit may be of any suitable known form such as a conventional L/C network, a magnetostrictive device as referred to in British Patent 667,218 or a thermionic valve circuit of the phantastron type. The time delay imposed thereby may be, say 50 microseconds. The output from this delay line on lead 23 is then applied as a triggering medium to a pulse generating circuit 24 which may comprise a flip-flop trigger circuit, e. g. of the type referred to on pages 166–170 of "Waveforms," vol. 19 of the M. I. T. Radiation Laboratory Series, 1949, providing a square pulse of predetermined time duration at each triggering. This square pulse output is fed over lead 25 to a buffer amplifier circuit 26 whose output supplies the input terminal 27 of the pulse modulating circuits 28 associated with the transmitter 18.

The pulse signal output from the pulse generating circuit 24 is also fed over lead 32 to a second fixed value time delay circuit 33, similar to the circuit 22 and also of delay time value of, say, 50 microseconds and the output from this delay circuit on lead 41 is supplied by way of buffer amplifier stage 42 to the input terminal 27 of the pulse modulator circuit 28 where it provides an alternative source of modulation input.

The square pulse output from the pulse generating circuit 24 is further supplied by way of lead 29 to the input terminal of a first variable time delay circuit 30 and also by way of lead 31, to the input terminal of a second variable time delay circuit 34. The circuit 30 is conveniently of the phantastron type as illustrated and described with reference to Fig. 34, page 2-63 of "Principles of Radar," M. I. T., 1946, but with the input triggering pulses derived from the leading edges of the square pulses from circuit 24 arranged to be positive-going and applied to the third grid of the valve V1 of that figure. The potentiometer R6 of such Fig. 34 which controls the variable delay time is shown at 35 in the present Fig. 1 and comprises a device capable of continuous and repeated rotation throughout its 360° sweep. The slider of this potentiometer is mechanically coupled by way of spindle 36 and bevel gearing 37 to the aerial shaft 13. The gearing 37 has a ratio of 36 to 1 so that the potentiometer 35 is swept through its 360° range of variation once in each 10° of azimuth scanning motion of the aerial structure 10 whereby the time delay imposed by the circuit 30 is varied as the aerial moves through each 10° arc, from a first or minimum value of, say 150 microseconds, to a second maximum value of, say 250 microseconds and then immediately recommences at such first value once again as the aerial moves to the next 10° sector and so on. The circuit 34 is similar to the circuit 30 with its delay control potentiometer 38 arranged with its slider mechanically coupled by way of spindle 39 and 1 to 1 gearing 40 to the aerial shaft 13. The circuit 34 thus sweeps through its range of time-delay variation once for each revolution of the aerial 10, the time delay value being of a first or minimum value of, say, 350 microseconds when the aerial is orientated with its beam directed due North, and of a second maximum value of, say, 450 microseconds at the extreme end of the 360° sweep, i. e. just as the aerial 10 is again approaching a due North orientation.

The delayed pulse output from delay circuit 30 is supplied by way of lead 44 to a pulse generating circuit 45, similar to the circuit 24, and the output from such circuit 45 is then fed through buffer amplifier 46 as a further alternative modulation input to the transmitter 18. The delayed pulse output from delay circuit 34 is similarly applied by way of lead 47 to pulse generating circuit 48 and thence through buffer amplifier stage 49 to the input terminal 27 of the modulator circuit 28.

The operation of such beacon station is as follows. The aerial structure 10 is rotated continuously. Upon reception of an interrogating pulse signal from some craft, this signal is passed to the receiver 17 and provides an output pulse which, after passing through the first fixed delay circuit 22, operates the pulse generating circuit 24 to provide a modulating pulse for the transmitter 18 by way of buffer 26. A first response pulse, hereinafter called the "prepulse" or P signal pulse, is radiated from the aerial 11, 50 microseconds after the arrival of the interrogating pulse. The same output pulse from circuit 24 causes a second response pulse, hereinafter called the "range" or T pulse a further 50 microseconds later, i. e. 100 microseconds after the arrival of the interrogating pulse, due to its passage through the second fixed delay circuit 33 and buffer 42. These two pulses are followed by third and fourth pulses, hereinafter called the "fine bearing" or F pulse and the "coarse bearing" or C pulse. The F pulse is produced by the same pulse from circuit 24 passing through variable time delay circuit 30 to pulse generating circuit 45 whose output pulse provides the required modulation of the transmitter 18 at a time instant after each T pulse which is indicative of the unit degree value of the bearing angle in azimuth of the rotating beam. Thus a third or F pulse 100 microseconds after a T pulse indicates a unit value of zero unit degrees whereas an F pulse 170 microseconds after a T pulse indicates a unit value of 7° and so on. The C pulse is similarly produced by circuits 34, 48 and 49 with a delay value, measured from the T pulse which indicates the particular bearing angle; thus, a delay of 300 microseconds after the T pulse indicates bearing 0° a delay of 320 microseconds a bearing angle of 72° and so on. By reason of the provision of the fine or F pulse it is necessary to take account of only the tens and hundreds figures of the coarse or C pulse indications as described later. Thus delay values between 300 and 302.8 microseconds, indicative of from 0° to 9.9° are regarded as of value 0°, those of from 302.8 microseconds to 305.5 microseconds as of value 10° and so on.

Figure 4:
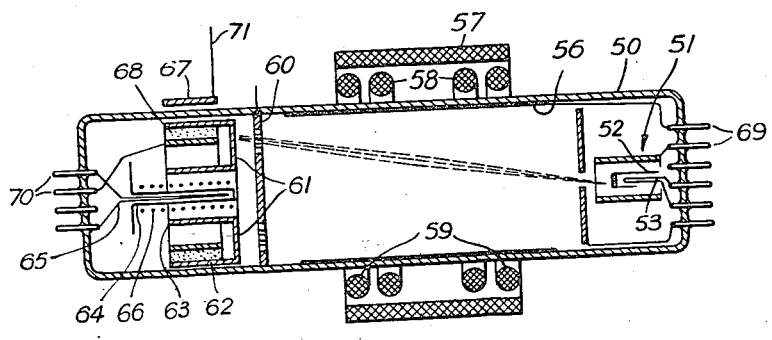
Figure 4 is a longitudinal sectional view of one form of cathode ray tube type of timing device.

The timing of the various pulse signals from the beacon station relative to the interrogation pulse timing at the mobile craft is illustrated in Figs. 3a, 3b and 3c The receiver of the craft equipment comprises a number of timing devices for directing the received signals into sequential channels and such devices each include a cathode-ray tube structure as illustrated in Fig. 4. This will first be described.

Such cathode ray tube timing device comprises a cylindrical envelope 50 at one end of which is located a normal electron beam gun assembly 51 comprising a cathode 52 with its associated internal heater 53 and surrounded by the usual modulating electrode 54 and an apertured plate 55. The central cylindrical portion of the tube is provided on its inner surface with an anode-forming conductive coating 56 and is surrounded externally with an electromagnetic focussing coil 57 and X- and Y-deflecting coils 58 and 59. Towards the opposite end of the tube there is disposed, in a position normal to the tube axis, an apertured screen 60 adjacent to a plurality of circumferentially arranged dynodes each including a secondary emitting surface 61 facing the screen 60 and associated with a capacitive output surface 62 closely adjacent the tube wall and a discharge surface 63 which lies opposite to a separate discharge cathode 64 having an internal heater 65 and a surrounding control grid 66. The various dynodes, whose number depends upon factors which will be referred to later, are supported upon a ceramic ring 68. Each of the capacitive output surfaces 62 is adapted to be passed over in turn by a rotating collector plate 67 which is movable around a circular path coaxial with the tube and in close spaced relationship to the outer surface of the tube wall. The various electrical connections to the tube elements are effected by way of connection pins 69 and 70.

In the operation of such a device the various electrodes are supplied with suitable operating potentials so that the electron beam formed at the cathode 52 and its associated focusing means is directed through the central region of the tube towards the apertured screen 60. The deflecting currents applied to the X- and Y-deflecting coils 58 and 59 are so adjusted that this beam sweeps over a circular path coincident with the series of circumferentially disposed apertures in the screen 62 whereby the beam passes through such apertures to impinge in turn upon the secondary emitting surface 61 of each of the dynodes.

The discharge cathode 64 is normally rendered inoperative by the application of a suitable suppressing bias potential to the associated control electrode 66. If, under these conditions, the tube beam is either cut off or is of low intensity, no secondary emission will take place from any of the surfaces 61 and in consequence the potential of the associated capacitive output surfaces 62 will not sensibly alter. If, however, at the instant of impingement of the tube beam upon a given dynode, the beam intensity is increased to a value sufficient to produce secondary emission from the surface 61 of that dynode there will be a consequential alteration of potential on the associated output surface 62 and such change of potential will be sensed by the rotating collector plate 67 as it passes thereover outside the tube and there will be delivered on the output connection 71 from such collector plate, an output voltage pulse indicative of the altered potential level of that particular dynode. The intensity of the tube beam, in the present application of the device, is controlled by input signals applied to the modulating electrode 54 and if several input signals in succession causes repeated bombardment of the same dynode, such input signals will, effectively, be integrated in the form of an increased amplitude output pulse from the rotating collector plate 67 as it passes over the capacitive output surface 62 associated with that particular dynode while, by reason of the persistence of the charge upon the dynode a memory or storage effect is produced. The stored charge or charges on the dynodes may be removed at any time by pulsing the control electrode 66 positively so as to allow space current flow from the discharge cathode 64 thereby equalising the potentials on the various dynodes.

Figure 2:
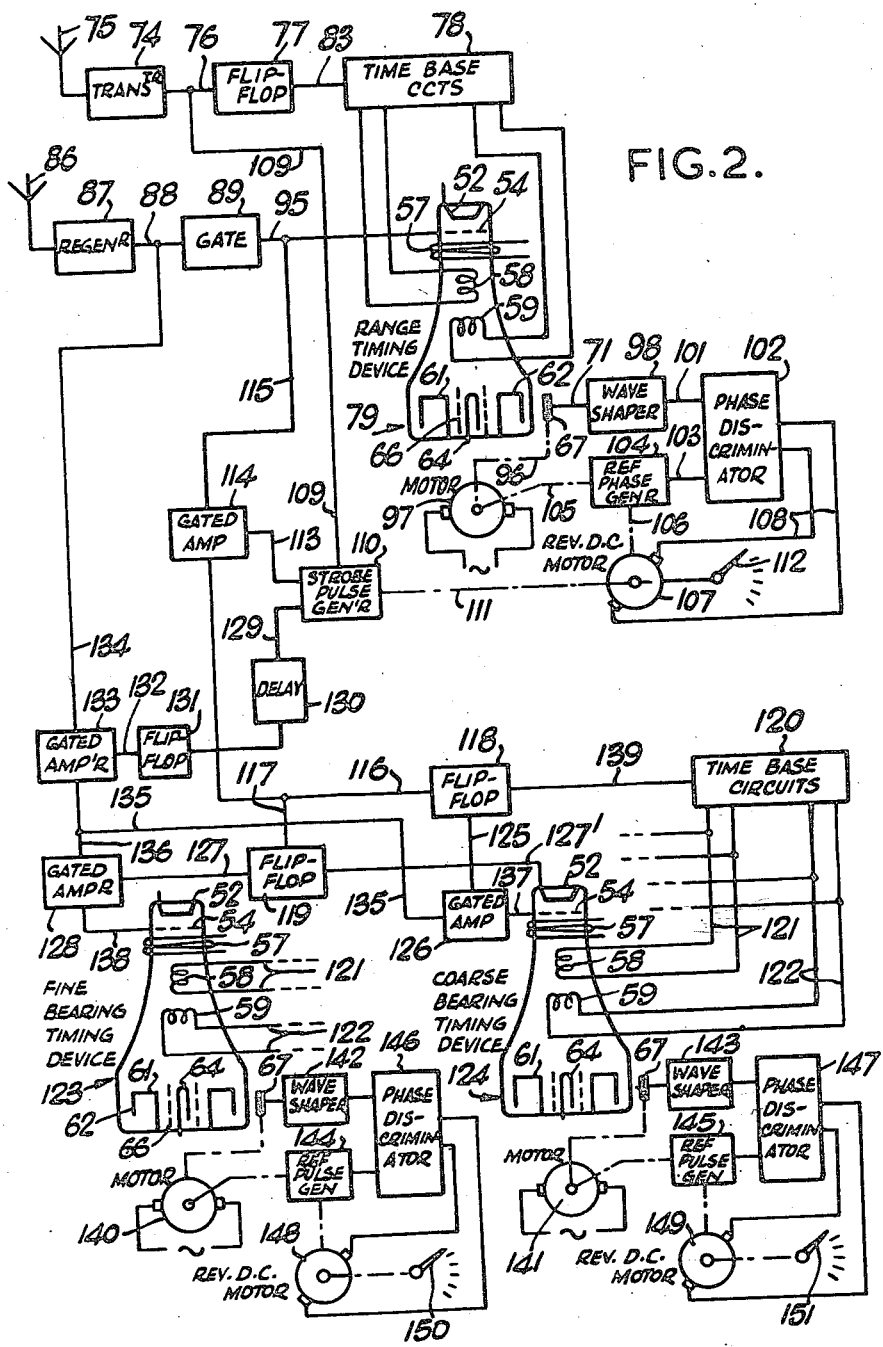
Figure 2 is a similar block schematic diagram of the arrangements provided in the mobile craft.

Referring now to Fig. 2, the arrangements on the craft comprise an interrogating transmitter 74 coupled to its, preferably omni-directional, aerial system 75. This interrogating transmitter may be of any suitable type such as are currently used in responder devices and is preferably of the continuously operating self-modulating type whereby it radiates a continuous series of pulsed interrogation signals at a suitable repetition frequency such that at least a few separate interrogation/response cycles can take place between the craft and the beacon station in the time period while the craft is within the aerial beam of the beacon. A convenient pulse repetition frequency is about 100 cycles per second which, with the previously discussed 5° width for the beacon beam rotating at 20 revolutions per minute, allows at least four and possibly five separate interrogations of the beacon by the craft each time the craft is within the beacon beam.

The modulating pulse developed within the transmitter 74 is also made available externally and is applied by way of lead 76 to a flip-flop type trigger circuit 77 which controls a time base generating circuit 78 associated with a first cathode ray tube timing device 79 of the form already described in connection with Fig. 4. The flip-flop circuit 77 is of conventional form, e. g. of the monostable multivibrator type referred to on pages 166–170 of the aforesaid vol. 19, M. I. T. Radiation Laboratory Series and provides an output in the form of a negative-going square pulse commencing in synchronism with the outgoing interrogating pulse from the transmitter 74 and persisting for a period sufficient to cover the time of reception of the beacon response pulse T. A convenient time, in the particular example being described, is 4 milliseconds as shown at Fig. 3e.

The form of the time base generating circuit 78 is shown in Fig. 5 and comprises a pulsed or ringing oscillator valve circuit such as that described on pages 140 et seq. of the aforesaid vol. 19 of M. I. T. Radiation Laboratory Series. The circuit shown in Fig. 5 is substantially that of Figs. 4–44 of the reference consisting of a valve 80 having an oscillatory circuit of parallel connected inductance 81 and capacitance 82 in its cathode lead. The valve is normally conductive and no oscillation takes place in the oscillatory circuit. When the valve is cut-off by the application of the negative pulse output (Fig. 3e) from the flip-flop circuit 77 to its control grid by way of lead 83, the circuit 81, 82 oscillates for a few cycles, one of which is shown in Fig. 3f. The frequency of oscillation is related to the maximum range to be indicated and in the present example is of the order of 1000 C. P. S. The frequency and the delay imposed by the circuits 24 and 33 of the beacon station (Fig. 1) are adjusted so that the complete oscillation cycle covers the time period when the response signal T may be received at the craft. The first part of the cycle is not used owing to its usually distorted form. The requisite sinusoidal currents in quadrature relationship for energising the X- and Y-deflecting coils 58, 59 of the device 79 are derived from tuned circuits 84, 85 loosely coupled to the inductance 81. These circuits are respectively tuned in the usual manner to provide a 45° lead and 45° lag on the current in inductance 81 so that when applied to the device 79 they produce a circular sweep of the tube beam. It will be understood that suitable amplifier means may be incorporated if necessary to provide the requisite amplitude of the deflection currents.

Referring again to Fig. 2, the response signals from the beacon station are received by the receiving aerial 86 and are applied to pulse signal receiver 87 which again may be of any suitable known form, e. g. as currently used in responder devices. The receiver output on lead 88, consisting of the four pulses P, T, F and C at each response, is applied to a gating device 89 whose form is shown in greater detail in Fig. 6.

This device 89 comprises an amplifier circuit 90 supplying its output to a delay circuit 91 whose output in turn is fed by way of a further amplifier 92 to act as an unblocking control voltage to a gated amplifier 93 whose input terminal is supplied over lead 94 with the output signals from the amplifier circuit 90 and whose output terminal is connected by way of lead 95 to the beam modulating electrode 54 of the timing device 79. The amplifiers 90, 92 are of conventional form while the delay circuit 91 may be of the L/C type or the magnetostrictive type as already described with reference to the device 22 of the beacon station. The gated amplifier 93 includes a pentode valve whose suppressor grid is normally held beyond the cut-off point and is raised above such cut-off point to make the amplifier operative by the signal output from amplifier 92.

The delay time of the circuit 91 is made equal to the time interval between the P and T pulses of the beacon station response, i. e. 50 microseconds in the particular example given, so that the P pulse does not pass through the amplifier 93 but does serve as an unblocking medium at the instant of subsequent arrival of the T pulse which alone passes through the amplifier to the timing device 79.

Returning to Fig. 2, the timing device 79 has its rotating collector plate 67 coupled to the spindle 96 of an electric motor 97 which is continuously energised from a suitable supply source. The output connection 71 from the collector plate 67 is connected to a wave shaping circuit 98 which comprises a clipping circuit such as shown in Fig. 7 including a valve 99 whose cathode is biased positively by connection to a tapping on potentiometer network 100 between a source of positive potential HT+ and earth so that all small amplitude noise and random signals are removed and only output signals of appreciable amplitude passed on its anode output lead 101 as well defined and squared pulses. This output lead 101 is connected to one input terminal of a phase discriminator circuit 102.

The other input terminal of the phase discriminator circuit 102 is supplied over lead 103 with the output from a reference phase generator 104 which provides a train of reference pulses resembling those obtained from the wave shaping circuit 98 and occurring one during each revolution of the collector plate 67 and adjustable in its timing relative to the angular position of such plate. This reference phase generator 104 resembles an alternator having its normal stator mechanically rotatable as well as its usual rotor. The rotor is mechanically coupled by coupling means 105 to the spindle 96 of the motor 97 so as to rotate in unison with the collector plate 67 whereas the adjustable position stator is arranged to be moved through coupling means 106 by a reversible D. C. electric motor 107.

The phase discriminator circuit 102 may be of any known suitable type capable of comparing the respective phases of two pulse-form input waveforms and providing a D. C. error signal, in the event of non-synchronism of such pulses, which is suitable for operating the motor 107 in the appropriate direction to correct the error. Examples of such circuits are to be found in Section 12–12 of "Electronic Instruments," vol. 21 of the M. I. T. Radiation Laboratory Series, 1948. The output from such discriminator circuit is fed by way of leads 108 to the motor 107. The spindle of the motor 107 is provided with a pointer 112 and cooperating scale indicating range values.

The externally available modulation pulses on lead 76 from the transmitter 74 are also applied over lead 109 to the triggering input terminal of a strobe pulse generator 110 which closely resembles the form of the previously described variable time delay circuits 30 and 34 of the beacon station. The adjustable potentiometer of the circuit (see Fig. 34, pages 2–63 of "Principles of Radar," M. I. T.) has its control spindle mechanically connected by coupling means 111 to the spindle of the motor 107. This generator accordingly supplies an output pulse which is delayed after its initial triggering (by the outgoing interrogating pulse) by a time interval which is varied according to the range indication and by adjustment of the circuit components this is, in the particular example described, made to have a minimum value of rather less than 100 microseconds when the indicated range is zero and a maximum value of, say 1200 microseconds when the indicated range is at a maximum value of 100 miles.

The delayed pulse output from the strobe waveform generator 110 is applied over lead 113 as an unblocking potential to a gated amplifier 114 which resembles that already described with reference to the element 93 of Fig. 6 whereby such amplifier is rendered operative for a short time interval only following each interrogating pulse but which time interval embraces the reception time of the T pulse of the response pulse train. The input terminal of the amplifier 114 is supplied by way of lead 115 from the output lead 95 from the gating device 89 while its output terminal is connected by way of leads 116 and 117 respectively to the triggering input terminals of separate flip-flop circuits 118 and 119.

The flip-flop circuit 118 is similar to that already described with reference to the circuit 77 and, like that circuit, is arranged to provide a negative-going square pulse output commencing in synchronism with the received T pulse and persisting for, say 400 microseconds as shown in Fig. 3g. This output waveform is applied over lead 139 to the bearing time base generating circuit 120 which is substantially identical with the circuit 78 already described and comprises a ringing oscillator circuit which provides a few cycles, say four cycles, of a sinusoidal oscillation as shown at Fig. 3h. This oscillation is conveniently, in the example being described, of a frequency of the order of 10,000 C. P. S. and serves as a source of two deflection waveforms, in quadrature relationship, for supply over leads 121 and 122 to the X- and Y-deflection coils 58 and 59 of two further cathode ray tube timing devices 123 and 124 which deal respectively with "fine" and "coarse" bearing indications. A paraphase version of the output waveform from flip-flop circuit 118 is applied over lead 125 as a control medium for a gated amplifier 126 similar in form to the amplifiers 93 and 114 already described.

The flip-flop circuit 119 is again similar to the circuits 77 and 118 and provides a positive-going square pulse output as shown in Fig. 3j commencing at the time of the T pulse signal and persisting for at least the time of the first two cycles of the bearing time base oscillation of Fig. 3g. This output waveform is applied by way of lead 127 as a control medium to a further gated amplifier 128 and also by way of lead 127¹ to the cathode 52 of the coarse bearing tube 124.

The delayed pulse output from the strobe pulse generator circuit 110 is also supplied over lead 129 to a delay circuit 130 and thence to trigger a further flip-flop circuit 131. The delay circuit 130 is of similar form to those previously described and imposes a delay, in this particular example, of rather less than 100 microseconds whereby the flip-flop 131 is triggered just before the earliest possible instant of arrival of an F pulse signal. The flip-flop circuit 131 again resembles those already described and provides, subsequent to each triggering, a positive-going output square pulse persisting until the last possible instant of arrival of a C pulse signal as shown at Fig. 3k. This output pulse waveform is applied by way of lead 132 as a control potential for a further gated amplifier 133, similar to those already described, and having its input terminal supplied over lead 134 from the output lead 88 from the receiver 87. The output from this amplifier 133 is supplied by way of leads 135 and 136 to the input terminals of amplifiers 126 and 128 respectively. The output from amplifier 126 is connected over lead 137 to the modulating electrode 54 of the tube 124 while the output from amplifier 128 is connected over lead 138 to the similar modulating electrode of the tube 123.

The timing devices 123 and 124 are each of the form already described with relation to the device 79 and have associated therewith electric motors 140, 141 for rotating their respective collector plates 67, wave shaping circuits 142, 143, reference phase generators 144, 145, phase discriminator circuits 146, 147 and D. C. control motors 148, 149, all similar in design and function to the corresponding elements associated with the device 79. If desired and convenient the motors 140, 141 may be dispensed with and the collector plates 67 driven in unison with that of the device 79 by the single motor 97. The motors 148 and 149 also operate respectively the "fine" and "coarse" range indicating pointers 150, 151.

The operation of the craft apparatus of Fig. 2 will now be described. The transmitter 74 is continuously operative to transmit interrogating pulses but whenever the craft is out of the beam of the beacon station no response signals are received. Immediately the craft is within the beam of the beacon the response signal train of pulses P, T, F and C will become available and the cycle of events is as follows:

At each outgoing interrogation pulse the time base generating circuit 78 of the range timing device 79 will be operated in response to the triggering of the flip-flop circuit 77 and the beam of the tube would, if not suppressed, perform four complete circular sweeps commencing at the instant of radiation of the outgoing interrogation pulse.

Initially, however, the tube beam is suppressed and as the gated amplifier 93 in the gating device 89 (Fig. 6) is blocked no signals or random noise can reach the tube 79. Upon the arrival of the first or P signal of the response train at some time, in the present example having a maximum range value of about 100 miles, between 50 microseconds (0 miles range) and 1060 microseconds (100 miles range) after the interrogating pulse dependent upon the distance between the craft and the beacon, this P signal pulse is effective upon the gating device 89 to render it conductive at a time 50 microseconds later still, i. e. in coincidence with the arrival of the next or T pulse of the response train. This T pulse is accordingly effective upon the tube 79 to turn on the beam thereof.

In the meantime, the beam deflection waveform (Fig. 3f) is proceeding on its first cycle and, dependent upon the range value, the beam will be turned on at some time during this cycle to impinge upon a particular one of the dynodes of the tube thereby altering the potential thereof. During the simultaneous rotation of the associated collector plate 67 an output pulse will be developed upon its output connection 71 to provide a first pulse input to the phase discriminator circuit 102 which is being continuously supplied also with reference pulses from the generator 104. In the event of non-alignment of these two input pulses, the phase discriminator circuit 102 provides an error signal which operates motor 107 to correct the timing of the reference pulse waveform and thereby alters the position of the pointer 112 to indicate the particular range value which is related to the bombarded dynode of the tube 79.

At the same time the strobe pulse generator 110 has been triggered at the time of the outgoing interrogation pulse and, due to its delay time control from the motor 107, provides an unblocking potential for the gated amplifier 114 during the subsequent time when the T pulse is available at the output of the gating device 89. This T pulse is therefore passed to the flip-flop circuit 118 which causes the time base generator circuit 120 to become operative to provide the requisite circular beam-scanning waveforms for the bearing timing devices 123 and 124, commencing in synchronism with such T pulse.

The beams of the devices 123, 124 are likewise normally suppressed in the absence of input signals to their respective modulation electrodes 54 and remain so until the gated amplifier 133 becomes unblocked by the delayed action of the output from the strobe pulse generator 110 through delay circuit 130 and flip-flop circuit 131. This amplifier is opened only during the period covering the arrival of the F and C pulses and these only of the four response pulses present on lead 134 are fed to the gated amplifiers 126 and 128.

The gated amplifier 128 is opened only during the period of possible arrival of the F pulse by the output from the flip-flop 119 which is also triggered by the T pulse passed through gated amplifier 114 while the same flip-flop output simultaneously blocks operation of the coarse bearing tube 124 by biasing its cathode positively. The next or F pulse is thus effective only upon tube 123 where a similar operation of the collector plate and the D. C. motor 148 and other associated parts takes place to operate the pointer 150 to indicate the "fine" or units bearing value.

Subsequently when flip-flop circuit 119 reverts to its normal state the amplifier 128 is again blocked and the bias removed from the cathode of the coarse bearing tube 124. As the gated amplifier 126 has been and still is held unblocked by the output from the flip-flop circuit 118, the next and last or C signal of the response train becomes effective upon tube 124 thereby to bring about operation of its D. C. motor 149 and indicating pointer 151 to display the "coarse" or tens and hundreds digit values of the bearing angle.

The remaining transmissions that occur whilst the craft is still in the beam of the beacon station result in the similar reception of the four pulses P, T, F and C at each interrogation. As during this period the craft remains substantially at the same distance from the beacon and as the beam remains substantially on the same bearing it follows that in each of the timing devices 79, 123 and 124, the wanted signals are directed into the same channels as before. The net result is that at the end of the four or more successive interrogation cycles occurring while the craft is in the beam, a strong signal is built up in one channel only by each of the timing devices, this channel representing the range of the craft or the bearing of the beam, as the case may be and the display pointers 112, 150, 151 are so operated as to indicate visually the values of these quantities. All other signals received while the craft is in the beam will have a more or less random timing and will be fairly evenly distributed over the various channels with, in consequence, little or no effect on the visual display. Even a signal which has been transmitted steadily during this short period will almost certainly have been directed sequentially to different channels and will not have built up during this period to anything approaching the amplitude of the wanted signal. Interrogation signals of substantially the same repetition rate from different aircraft (even if at the same range) will not be sufficiently closely synchronised to be directed into the same channel and they will, effectively, constitute random pulses only.

If desired means may be provided for periodically clearing the various timing devices of the stored information in the various channels by providing a suitable positive-going pulse to each of the control electrodes 66 associated with the discharge cathodes 64. This may be effected by suitable timing means such as a clock device operating to close the pulsing circuit at periodic intervals, say once per second.

The number of dynodes provided on the respective tubes 79, 123 and 124 will depend upon the degree of accuracy required for the resultant indications. Thus, if the "range" tube 79 is to deal with a maximum range of 100 miles to the nearest mile, 100 dynodes will be required whereas if the range is to be only 20 miles to the nearest half-mile, then only 40 dynodes will be required.

It will be understood that the various specific time delay and other values quoted above are by way of example only and may, in practice, vary considerably according to requirements.

Numerous modifications may clearly be made without departing from the scope of the invention.

The timing devices may be of a form different from that particularly described above. They may each consist, for example, of a cathode ray tube having in place of the normal screen, a number of closely spaced anode plates, one for each channel, arranged peripherally. The tube beam, whose intensity is modulated in direct dependence upon the received signals, is arranged to scan these anodes sequentially at a constant speed which is accurately controlled; each scan starting from a given zero position at the instant when the interrogating signal is transmitted from the associated interrogating transmitter or at a fixed predetermined time interval thereafter. The peripheral position of the anode at which the beam is directed when a response signal arrives is clearly representative of the time which has elapsed since the transmission of the interrogating signal and is hence representative, within the limits imposed by the total number of anodes and the speed of scanning them, of the range of the craft from the beacon at that instant. Arrangements are provided for integrating the signals received at each channel during each group of interrogating cycles when the craft is in the beam. Such arrangement may comprise a condenser for each of the anode plates, which condenser is charged when the beam is resting on such anode plate and is modulated by a response signal. The charge built up on the condenser of the particular channel is then used to cause the operation of indicating means such as by the striking of a neon tube or by the use of a follow-up servo system which searches for and determines the condenser having the greatest charge and provides a visual display accordingly.

An alternative form of timing device may take the form of a cathode ray tube store such as is described by F. C. Williams in the Proceedings of the Institution of Electrical Engineers, volume 96, part II, page 183. In this case the tube beam may be arranged to scan the screen of the tube in any convenient raster, starting from some chosen zero position. The charge distribution over the screen will be uniform except where a received signal has modulated the beam. At the end of each interrogation cycle the screen is again scanned from the same zero position, this time by an unmodulated beam and a response is developed in the output circuit as soon as the tube beam reaches the point of the raster where the uniform charge distribution is disturbed by reason of the previously received signal. The time interval between the starting of this second scanning operation and the instant of response in the output circuit to the disturbed charge distribution area is thus a measure of the range or bearing and an appropriate indication may be derived from this time interval in convenient manner.

Similarly the various gating arrangements by which unwanted signals are excluded from possible effects in the various timing devices may be varied in many ways. Thus the application of such pulses to their respective timing devices may be simply effected by means of gate circuits which are normally closed and which are each opened by a short control pulse provided by the output from a delay device or flip-flop trigger circuit which is supplied with the preceding pre-pulse or P response signal. The time delay of each of the various delay devices or trigger circuits is adjusted to be of an appropriate value such that the gate is opened just before the expected time of arrival of the particular response signal pulse which is required and closes again soon after such pulse has occurred.

In another modification separate time bases may be used for the fine and coarse bearing tubes 123 and 124, such time base circuits being triggered by the T pulse of each response through suitable time delay circuits of appropriate value to cause commencement of each of the time bases in synchronism with the time period during which the related F or C pulses may be expected It will be understood that in connection with the above described use of phantastron type circuits as described in volume 19 of the reference "Principles of Radar," the required delayed pulse is developed from the trailing or delayed edge of the phantastron pulse. Such pulse development may be by means of a suitable differentiating circuit or may include a further flip-flop type circuit which is triggered by the delayed edge and which provides thereafter a pulse of a time duration determined by the constants of the flip-flop circuit itself.

I claim:

1. A radio navigator system comprising a radio beacon of the responder type having a directional beam moving in azimuth and co-operating apparatus on a craft, said apparatus comprising transmitter means for interrogating said beacon when in the beam thereof, a receiver for receiving response signals from said beacon, a timing device associated with said receiver for directing the received response signals into sequential channels in dependence on the time of arrival of such signals and display means for indicating the channel containing the strongest integrated signal.

2. A radio navigation system comprising a radio beacon of the pulse modulated responder type having a directional beam moving in azimuth and providing a first response pulse signal at a predetermined time instant after the arrival of an interrogating pulse and a second response pulse signal at a time instant after said first response pulse signal which is determined by the instantaneous bearing direction of said beam and co-operating apparatus on a craft, said apparatus comprising pulse transmitter means for interrogating said beacon when in the beam thereof, a receiver for receiving response pulse signals from said beacon, a first timing device associated with said receiver for directing said received first response pulse signals into sequential channels in dependence on the time of arrival of such signals, first display means for indicating the channel containing the strongest integrated signal in said first timing means, a second timing device associated with said receiver for directing said received second response pulse signals into sequential channels in dependence upon the time of arrival of such signals and second display means for indicating the channel containing the strongest integrated signal in said second timing means.

3. A radio navigation system comprising a radio beacon of the pulse modulated responder type having a directional beam moving in azimuth and providing a first response pulse signal at a predetermined fixed time instant after the arrival of an interrogating signal, and second and third response pulse signals at different time instants after said first response pulse signal which times are determined by fine and coarse measurements of the instantaneous bearing direction of said beam and co-operating apparatus on a craft, said apparatus comprising pulse transmitter means for interrogating said beacon when in the beam thereof, a receiver for receiving response pulse signals from said beacon, a first timing device associated with said receiver for directing the received first response pulse signals into sequential channels in dependence on the time of arrival of such signals, first display means for indicating the channel containing the strongest integrated signal in said first timing means to provide a range indication, a second timing device associated with said receiver for directing the received second response signals into sequential channels in dependence upon the time of arrival of such signals, second display means for indicating the channel containing the strongest integrated signal in said second timing means to provide a fine indication of bearing direction, a third timing device associated with said receiver for directing the received third response signals into sequential channels in dependence upon the time of arrival of such signals and third display means for indicating the channel containing the strongest integrated signal in said third timing means to provide a coarse indication of bearing direction.

4. A radio navigation system according to claim 2 in which said craft apparatus comprises gating means between said receiver and each of said first and second timing devices, said gating means being controlled to prevent first response pulse signals reaching said second timing device and to prevent second response signals reaching said first timing device.

5. A radio navigation system according to claim 3 in which said craft apparatus comprises gating means between said receiver and each of said first, second and third timing devices, said gating means being controlled to prevent first response pulse signals reaching either of said second or third timing devices, to prevent second response pulse signals reaching either of said first or third timing devices and to prevent said third response pulse signals reaching either of said first or second timing devices.

6. A radio navigation system comprising a radio beacon of the responder type having a highly directional beam radiating continuously in azimuth and operating with pulse form signals and co-operating apparatus on a mobile craft, said craft apparatus comprising an interrogating pulse transmitter for integrating said beacon when in the beam thereof, a pulse signal receiver for receiving response pulses radiated by said beacon, a timing device supplied with the output signals from said receiver, said timing device including means for directing such response pulses into sequential channels in dependence upon the time delay of the arrival of such response pulses after the instant of transmission of the related interrogating pulses, sensing means for determining the channel containing the strongest integrated signal and display means operated by said sensing means for providing a visual indication determined by the position of said channel in said sequence of channels.

7. A radio navigation system according to claim 6 in which said beacon comprises means for causing transmission of a first response pulse at a predetermined fixed time after the arrival of an interrogating pulse and further means controlled by the instantaneous bearing direction of said beam for providing at least one further response pulse at a variable time after said interrogating pulse, such time being controlled by and characteristic of such instantaneous bearing direction.

8. A radio navigation system according to claim 7 which includes a further timing device also supplied with the output, further response pulses from said receiver and for directing such pulse signals into sequential channels in dependence upon the time delay of the arrival of such signals after the instant of transmission of said interrogating pulse, further sensing means for determining the channel containing the strongest interrogating signal in said further timing device and bearing display means operated by said further sensing means for providing a visual bearing indication determined by the position of said channel in said sequence of channels.

9. A radio navigation system according to claim 6 in which said radio beacon includes means for causing transmission of a first response pulse at the end of a predetermined fixed time interval after the arrival of an interrogating pulse and further means controlled by the instantaneous bearing direction of said beam for providing two further response pulses after variable time intervals subsequent to said first response pulse each of said variable time intervals being indicative of said bearing direction and one of said further response pulses providing a coarse indication of said bearing direction and the other of said further response pulses providing a fine indication of said bearing direction.

10. A radio navigation beacon of the responder type comprising a directional aerial system moving in azimuth, an interrogating pulse receiver connected to said aerial system, a response pulse transmitter connected to said aerial system, pulse modulation control means for said response signal transmitter, said modulation control means being operated by the output from said receiver to cause radiation of a plurality of sequential response signals in response to each received interrogating signal, at least one of said response signals being radiated after a fixed value time delay following reception of said interrogation signal and at least one other of said signals being radiated at a time subsequent to said first signal which is variable according to the instantaneous bearing direction of said beam.

11. Apparatus for use on a craft in conjunction with a radio navigation beacon of the responder type having a directional beam radiating in azimuth, said apparatus comprising an interrogating transmitter, a response signal receiver, a timing device supplied with the signal output from said receiver and synchronised by said interrogating transmitter for directing signals received in response to such interrogation signal into sequential channels in dependence on the time of arrival of such signals after said interrogating signal and display means for indicating the channel containing the strongest integrated signal.

12. Apparatus for use on a craft in conjunction with a radio navigation beacon of the pulse modulated responder type having a directional beam rotating in azimuth and providing at least a first response pulse at a fixed time after the arrival of an interrogating pulse and a second response pulse at a variable time after said first response pulse dependent upon the instantaneous bearing direction of said beam, said apparatus comprising an interrogating transmitter, a response signal receiver, a first timing device supplied with the signal output from said receiver and synchronised by said interrogating transmitter for directing said received first response pulse signals received in response to such interrogation into sequential channels in dependence on the time of arrival of such signals after said interrogating signal, first display means for indicating the channel containing the strongest integrated signal and thereby providing a range indication, a second timing device supplied with the signal output from said receiver and synchronised by said interrogating transmitter for directing said received second response pulse signals into sequential channels in dependence upon the time of arrival of such signals after the interrogating signal and second display means for indicating the channel containing the strongest integrated signal and thereby providing a bearing indication.

13. Apparatus according to claim 11 in which said timing device comprises a cathode ray tube electrode assembly, means for causing deflection of the tube beam over a predetermined scanning path, charge receiving elements at different positions along said scanning path and operated upon by said beam, circuit means for applying received signals to modulate said beam and sensing means co-operating with said charge surfaces for determining which of said surfaces has acquired the greatest charge.

14. Apparatus according to claim 11 in which said timing device comprises a cathode ray tube electrode assembly, means for causing deflection of the tube beam over a predetermined circular scanning path, a plurality of secondary emissive elements at different circumferential positions around said scanning path and each operable upon by said beam in turn, circuit means for applying received signals to modulate said beam to increase its intensity, individual charge receiving surfaces connected one to each of said secondary emissive elements and a movable collector plate movable past each of said charge receiving surfaces in turn.

15. Apparatus according to claim 11 in which said timing device comprises a cathode ray tube electrode assembly, means for causing deflection of the tube beam over a pre-determined circular scanning path, a plurality of secondary emissive elements at spaced circumferential positions around said circular scanning path and each operable upon by said beam in turn, circuit means for applying received signals to modulate said beam to increase its intensity, a plurality of charge receiving surfaces electrically connected one to each of said secondary emissive elements, said charge receiving surfaces being arranged around a circular path, a rotatable collector plate movable past each of said charge receiving surfaces in turn, a driving motor for continuously rotating said collector plate, a reference pulse generator operated by said driving motor and producing a single output pulse once for each revolution of said collector plate, said reference pulse generator including control means for adjusting the phase of said output pulse relative to the angular position of said collector plate, an output signal connection from said collector plate, a phase discriminator device having two input terminals connected respectively to said collector plate signal connection and said reference pulse generator and output terminals for delivering an error signal, a further driving motor supplied from said output terminals of said phase discriminator device, a driving connection between said further motor and said control means of said reference pulse generator and an indicator coupled to said further motor.

16. Apparatus according to claim 15 wherein said timing device includes a further discharge cathode adjacent said secondary emissive elements and a control electrode adjacent said discharge cathode for governing its effectiveness to remove any charge acquired by said secondary emissive elements.

References Cited in the file of this patent

UNITED STATES PATENTS

| | | |
|---|---|---|
| 2,616,076 | Lyman et al. | Oct. 28, 1952 |
| 2,637,021 | Silverman | Apr. 28, 1953 |
| 2,660,669 | West | Nov. 24, 1953 |